United States Patent
Ho (10) Patent No.: US 10,080,195 B2
(45) Date of Patent: *Sep. 18, 2018

(54) ACCESS AND POWER MANAGEMENT FOR CENTRALIZED NETWORKS

(71) Applicant: Texas Instruments Incorporated, Dallas, TX (US)

(72) Inventor: Jin-Meng Ho, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,422

(22) Filed: Oct. 13, 2017

(65) Prior Publication Data

US 2018/0041963 A1 Feb. 8, 2018

Related U.S. Application Data (63) Continuation of application No. 14/978,312, filed on Dec. 22, 2015, now Pat. No. 9,813,991, which is a (Continued)

(51) Int. Cl.
*H04L 12/28* (2006.01)
*H04W 52/02* (2009.01)
(Continued)

(52) U.S. Cl.
CPC ....... *H04W 52/0235* (2013.01); *H04W 48/16* (2013.01); *H04W 52/0216* (2013.01); *H04W 52/0248* (2013.01); *H04W 72/042* (2013.01); *H04W 72/0413* (2013.01); *H04W 74/06* (2013.01); *H04W 74/006* (2013.01); *Y02D 70/00* (2018.01)

(58) Field of Classification Search
USPC ................. 370/348, 252, 311, 329
See application file for complete search history.

(56) References Cited

U.S. PATENT DOCUMENTS

| | | |
|---|---|---|
| 6,791,996 B1 | 9/2004 | Watanabe et al. |
| 7,912,033 B2 | 3/2011 | Heidari-Bateni et al. |
| 8,159,977 B2 | 4/2012 | Meier |
| 9,894,609 B2 * | 2/2018 | Salomone ......... H04W 52/0225 |
| 2004/0253996 A1 | 12/2004 | Chen et al. |
| 2004/0259542 A1 | 12/2004 | Viitmaki et al. |

(Continued)

OTHER PUBLICATIONS

Davenport et al., MedWiN MAC and Security Proposal—Documentation, IEEE P802.15, May 4, 2009.

*Primary Examiner* — John Pezzlo
(74) *Attorney, Agent, or Firm* — Tuenlap D. Chan; Charles A. Brill; Frank D. Cimino (57) ABSTRACT

A system and method for managing power in a subnet having a hub in communication with one or more nodes is disclosed. The hub and nodes communicate using one or more non-contention access methods, such as scheduled, polled or posted access. The node may enter a sleep or hibernation state while no scheduled, polled or posted allocation interval is pending. The hibernation state allows the node to hibernate through one or more entire beacon periods. In the sleep state, the node may be asleep between any scheduled, polled and posted allocation intervals for the node or during another node's scheduled allocation interval in a current beacon period. By selecting which access scheme is in use, the node and hub can increase the node's chances to be in hibernation or sleep state and minimize power consumption.

20 Claims, 10 Drawing Sheets

Related U.S. Application Data continuation of application No. 14/174,460, filed on Feb. 6, 2014, now Pat. No. 9,258,783, which is a continuation of application No. 12/697,105, filed on Jan. 29, 2010, now Pat. No. 8,670,435.

(60) Provisional application No. 61/148,607, filed on Jan. 30, 2009.

(51) Int. Cl.
*H04W 74/06* (2009.01)
*H04W 48/16* (2009.01)
*H04W 72/04* (2009.01)
*H04J 1/16* (2006.01)
*H04W 74/00* (2009.01)

(56) References Cited

U.S. PATENT DOCUMENTS

| | | |
|---|---|---|
| 2005/0003794 A1 | 1/2005 | Liu |
| 2005/0135284 A1* | 6/2005 | Nanda ............... H04L 29/06068 370/294 |
| 2005/0135295 A1* | 6/2005 | Walton .................. H04L 5/0048 370/328 |
| 2006/0128349 A1 | 6/2006 | Yoon |
| 2007/0053315 A1 | 3/2007 | Sugaya |
| 2007/0058659 A1 | 3/2007 | Ayyagari et al. |
| 2008/0040509 A1 | 2/2008 | Werb et al. |
| 2008/0181157 A1 | 7/2008 | Aoki |
| 2009/0016314 A1 | 1/2009 | Kim |
| 2010/0157955 A1* | 6/2010 | Liu ..................... H04W 74/002 370/336 |
| 2017/0156104 A1 | 6/2017 | Grandhi et al. |

* cited by examiner

ACCESS AND POWER MANAGEMENT FOR CENTRALIZED NETWORKS

CROSS-REFERENCE TO RELATED APPLICATIONS

This application is a continuation of application Ser. No. 14/978,312, filed Dec. 22, 2015, which is a continuation of application Ser. No. 14/174,460, filed Feb. 6, 2014, which is a continuation of application Ser. No. 12/697,105, filed Jan. 29, 2010, which claims the benefit of Provisional Application No. 61/148,607, filed Jan. 30, 2009, the entireties of all of which are hereby incorporated by reference.

BACKGROUND

Portable wireless devices are typically operated on battery power, which provides a finite operating life before the battery must be recharged or replaced. The drain on the battery varies depending upon the operating mode of the device. Relatively high power levels may be required used when the device is transmitting signals to other devices or receiving and processing signals from other devices. In existing systems, devices may be shifted between an awake and a sleep mode in order to conserve power. These awake and sleep modes typically correspond to fixed periods, such as every few superframes or beacon periods. As a result, the devices are in the awake mode for entire beacon periods even though the device may need to receive or transmit frames for only a portion of the beacon period. The remaining time between such receive or transmit processing is essentially a waste of the device's power.

One reason for keeping a device in the awake mode for an entire beacon period is that the device may not know when unscheduled frames may be received from a hub or cluster controller. The device cannot afford to transition to a sleep mode because it may miss such unscheduled frames. Accordingly, there is a need for a medium access selection process that allows for more accurate control of the awake and sleep modes of a wireless device to minimize power consumption.

SUMMARY OF THE DISCLOSURE

Embodiments of the disclosure provide flexible and simple time allocations to devices with different power management attributes. A unified framework of non-contention access methods, including scheduled, polled and posted access, enables different levels of tradeoffs between power consumption and medium access. Long-run and short-run power management can be controlled by selecting the medium access method used by a device.

A device may use scheduled access for a persistent allocation on a communication medium. The scheduled access may be a 1-periodic allocation in which an allocation interval reoccurs in every beacon period. The 1-periodic allocation is suitable for high-duty or quasi-periodic traffic. The scheduled access may also be a multi-periodic (m-periodic) allocation that reoccurs over a longer interval, such as every $m^{th}$ beacon period (where m>1). The m-periodic allocation is suitable for low duty cycle periodic or quasi-periodic traffic. The 1-periodic and m-periodic allocations may be used for both uplink and downlink traffic. The 1-periodic and m-periodic allocation intervals are defined as starting some time T1 after the start of the beacon frame time within a beacon period. The beacon frame may shift position within each of the beacon periods. If insufficient time remains in the beacon frame after the start of the beacon frame, then the start time of the scheduled allocation wraps around the beacon period and beings before the beacon frame.

The device may also use a transient allocation that designates one or more time intervals that occur only in the next beacon period. The transient allocation may be designated in a beacon frame and identifies the allocation interval in the next beacon period. The transient allocation is suitable for aperiodic traffic having a low duty cycle.

The device may use polled access by indicating its ability to receive polled allocations. The hub sends the device a polled allocation that designates an interval other than a scheduled allocation or beacon frame. The hub may designate an immediate polled allocation that beings after waiting for a turnaround inter-frame space (TIFS) time to elapse or a future polled allocation that starts at a later time within the beacon period. Once a polled allocation starts, the node uploads frames that are received and acknowledged by the hub.

The hub may use a posted allocation to designate a posted allocation interval in which it sends frames to the node. The frame designating the posted allocation may indicate an immediate posted allocation interval that starts TIFS after the frame, or a future posted allocation that beings at a later time in the beacon period. The hub downloads frames to the node, which receives and acknowledges the frames.

The node may employ a hibernation mode or a sleep mode. The hibernation mode enables long-run or macroscopic power management. In the hibernation mode, the node is asleep for one or more entire beacon periods during which it does not transmit or receive frames. The sleep mode enables short-run or microscopic power management. In the sleep mode, the node is asleep for some portions of a beacon period, but is awake for other portions of the beacon period to service scheduled, polled and posted allocations. By selecting the sleep or hibernation mode used by the node, and selecting the access method used to transfer frames to or from the node, a node may optimize the amount of sleep or hibernation time it uses and thereby conserve power.

BRIEF DESCRIPTION OF THE DRAWINGS

Having thus described the disclosure in general terms, reference will now be made to the accompanying drawings, wherein:

DETAILED DESCRIPTION

The disclosure now will be described more fully hereinafter with reference to the accompanying drawings. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. One skilled in the art may be able to use the various embodiments of the disclosure.

In an exemplary embodiment of the disclosure, a hub communicates with one or more nodes in a subnet. Different access methods are provided for the nodes and hub to exchange frames, such as through scheduled allocations, polled and posted allocations. A scheduled access may include a persistent allocation, such as a 1-periodic that assigns one or more time intervals that reoccur in each beacon period for access by a single node or an m-periodic allocation that assigns one or more time intervals that reoccur in m beacon periods (i.e. skipping m−1 beacon periods between occurrences). A persistent allocation is usable by the node for up to a specified number p of beacon periods without receiving a beacon.

The node requests a persistent allocation by sending a Connection Request to the hub. The hub accepts, modifies, or rejects the request by sending a Connection Assignment back to the node. The hub modifies a persistent allocation unilaterally, if required, by sending another Connection Assignment to the node. Either the node or the hub may delete a persistent allocation by sending a Disconnection frame. A node should not have both 1-periodic and m-periodic allocations at the same time.

Figure 1:
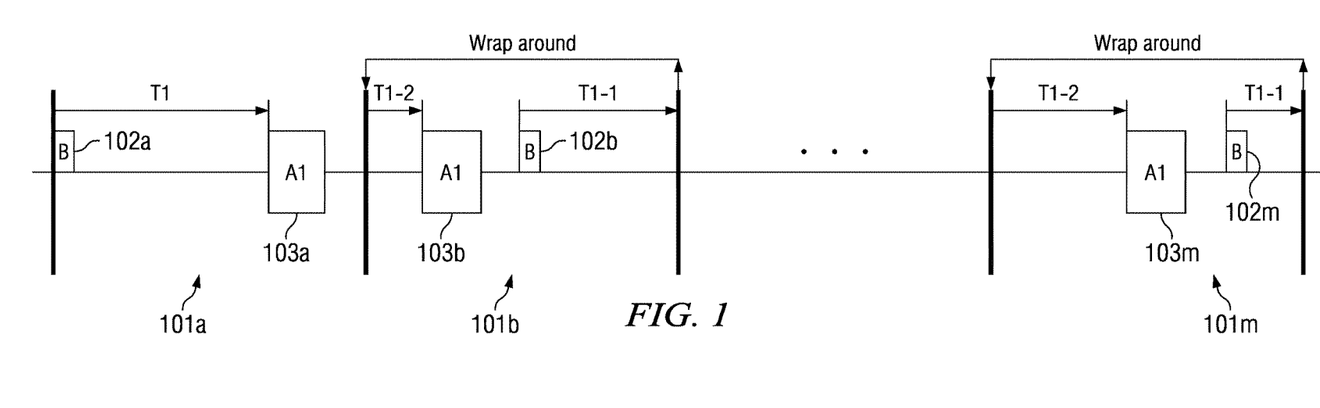
FIG. 1 illustrates a 1-periodic allocation interval occurring over a plurality of beacon periods.

FIG. 1 illustrates a 1-periodic allocation interval occurring over a plurality of beacon periods 101a-m. Beacon frame B 102a-m is broadcast in each beacon period 101a-m. The beacon frame 102a-m may change position from one beacon period 101a-m to the next according to a beacon shifting sequence. The beacon shifting sequence minimizes mutual interference between two or more neighboring subnets by shifting each hub's beacon frame 102 within each beacon period 101 according to a pseudo-random sequence. A scheduled, 1-periodic allocation interval A1 103a-m is assigned to a first node. The allocation interval A1 103 is defined as starting at time T1 relative to the beacon transmission time within each beacon period. The 1-periodic allocation has one or more allocation intervals spanning the same allocation slots in every beacon period.

The location of each allocation slot, and the corresponding allocation interval A1, shifts with the beacon start time. This temporal shift is based on the beacon transmission time pattern or beacon shift sequence selected by the hub. When the time remaining in a beacon period following the start of the beacon frame is less than time T1, the 1-periodic allocation interval 103 "wraps around" the beacon period. For example, in beacon period 101a, allocation interval 103a occurs at time T1 after the start of beacon frame 102a. However, in beacon frames 101b and 101m, the time T1−1 that is remaining after the start of the beacon frame (102b,m) is less than T1. Therefore, the allocation intervals (103b,m) start before the beacon frame at time T1−2 after the start of the beacon period, where T1−1+T1−2=T1. The first node wakes up in every beacon period during allocation intervals 103.

Figure 2:
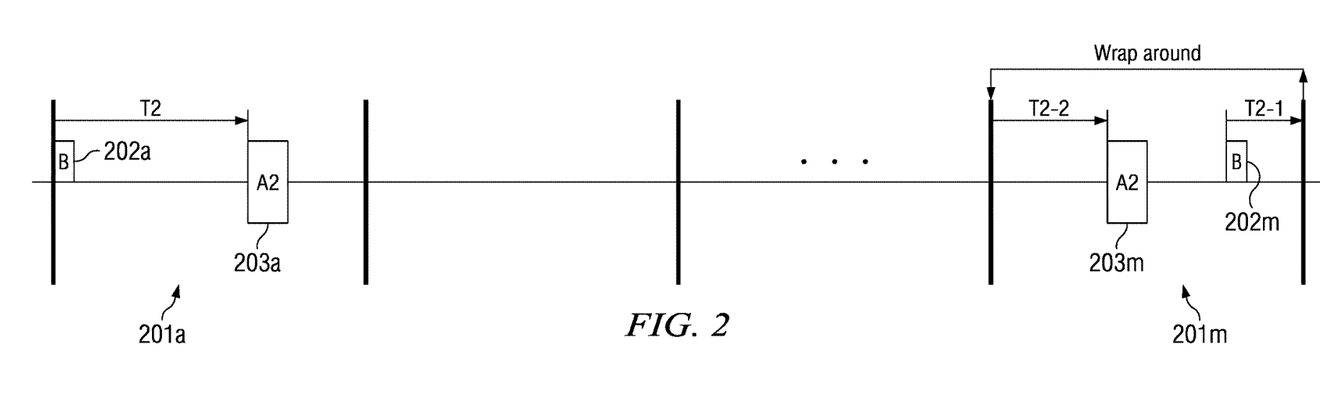
FIG. 2 illustrates an m-periodic allocation interval repeating every m beacon periods.

FIG. 2 illustrates an m-periodic allocation interval repeating every m beacon periods. An m-periodic allocation has one or more allocation intervals spanning the same allocation slots in every m beacon periods, where m>1. In FIG. 2, m-periodic allocation intervals 203 are assigned to a second node. M-periodic allocation intervals 203a,m appear in every m beacon periods 101a,m. The m-periodic allocation intervals 203a,m start time T2 after the start of beacon frame 202a,m. If the time remaining in a beacon period following the start of the beacon frame is less than time T2, the m-periodic allocation interval 203 "wraps around" the beacon period. For example, in beacon period 201m, m-periodic allocation interval 203m begins time T2−2 after the start of the beacon period because only time T2−1 is remaining after beacon frame 202m, wherein T2−1+T2−2=T2. The second node wakes up in the beacon periods containing allocation intervals A2 203, or one beacon period out of every m>1 beacon periods.

Figure 3:
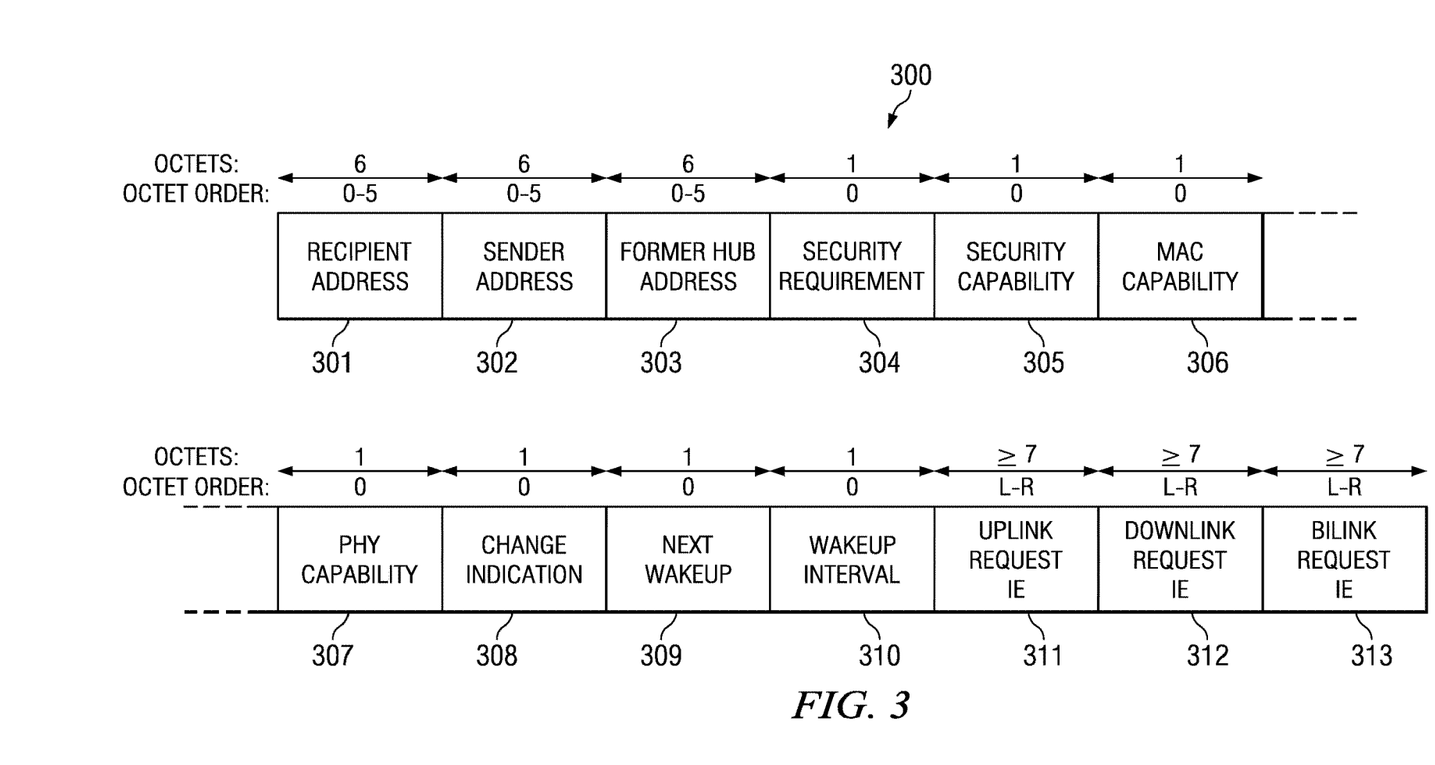
FIG. 3 illustrates a payload section of a connection request frame according to one embodiment.

To obtain one or more new scheduled allocations, a node sends a Connection Request frame to the hub. FIG. 3 illustrates a payload section of a Connection Request frame 300 according to one embodiment. Connection Request frame 300 is transmitted by a node to request creation or modification of a connection with a hub. Recipient Address field 301 is set to the medium access control (MAC) layer address of the hub intended to receive the current frame. Sending Address field 302 is set to the MAC address of the node sending the current frame. Former Hub Address field 303 is set to 0 if the sending node was not connected to another hub previously. Otherwise, field 303 is set to the MAC address of the hub with which the node was last connected. Security Requirement field 304 includes data to identify the lowest security level required by the node and to identify whether control frames sent to the node must be authenticated and/or encrypted. Security Capability field 305 includes information identifying the highest security level supported by the node. MAC Capability field 306 includes data indicating whether the node supports block acknowledgement policy, polls, random access, battery level indication, and other MAC functions. PHY Capability field 307 indicates whether the node supports lower power wakeup radio and the data rates supported by the node.

Change Indication field 308 indicates whether any of the information in fields 309-313 have changed since the last connection request. Next Wakeup field 309 is set to the sequence number of the beacon transmitted in the beacon period, referred to as the node's wakeup beacon period, in which the node will wake up for frame reception and transmission. Wakeup Interval field 310 is set to the length, in units of beacon periods, between the start of successive wakeups of the node, and is effective from the next wakeup indicated in field 309. Wakeup Interval field 310 is set to 1 for 1-periodic allocations and to m>1 for m-periodic allocations. Uplink Request information element (IE) field 311 indicates a request for creation or modification of scheduled uplink allocations for the node. Downlink Request IE field 312 indicates a request for creation or modification of scheduled downlink allocations for the node. Bilink Request IE field 313 indicates a request for creation or modification of scheduled bilink allocations for the node.

Figure 4:
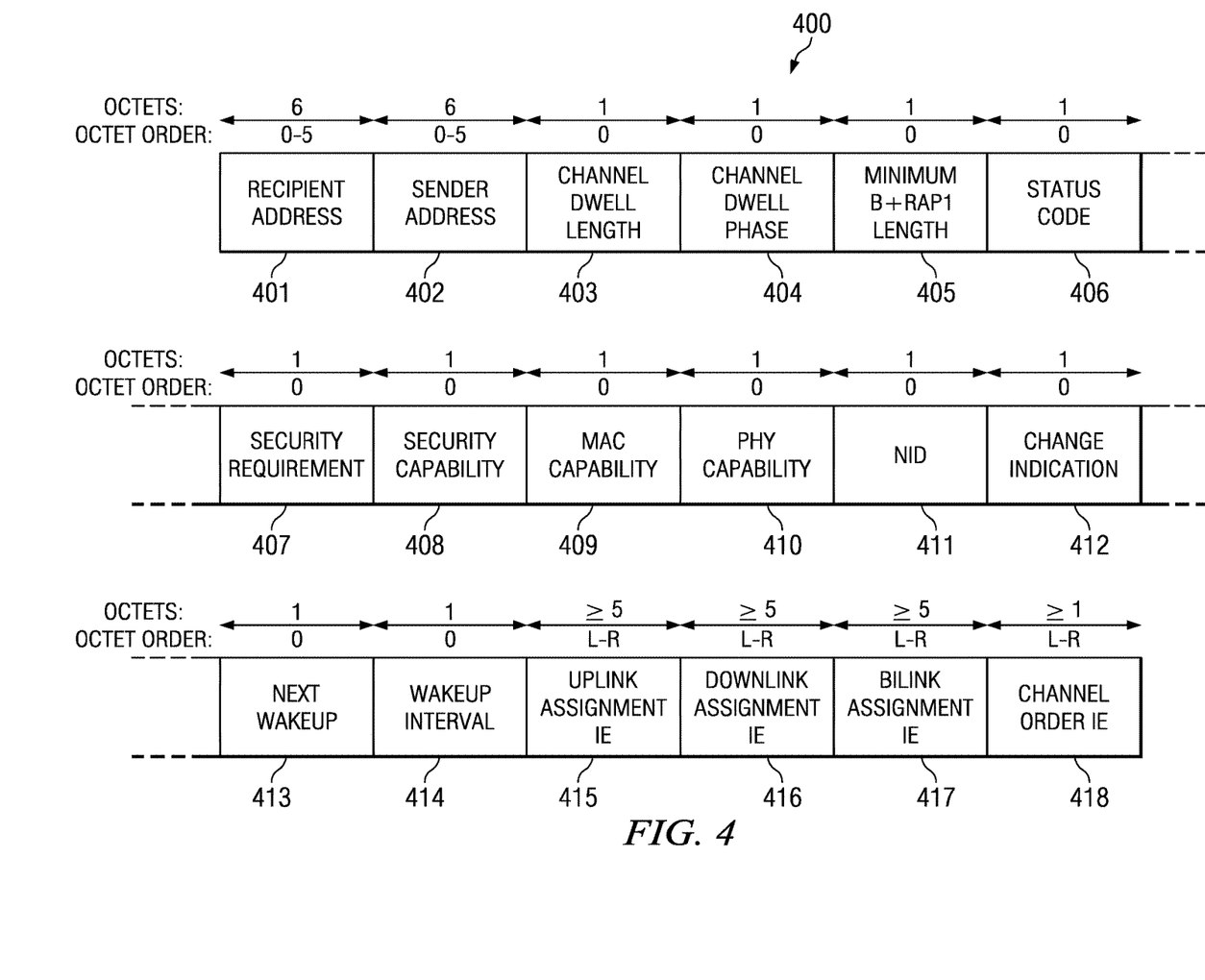
FIG. 4 illustrates a payload section for a connection assignment frame according to one embodiment.

To grant scheduled allocations, the hub responds to the Connection Request frame by sending a Connection Assignment frame to the node. FIG. 4 illustrates a payload for a Connection Assignment frame 400 according to one embodiment. Connection Assignment frame 400 is transmitted by the hub in response to a connection request, such as Connection Request frame 300, or to change an earlier connection assignment. Recipient Address field 401 is set to the MAC address of the node intended to receive the current frame. Sending Address field 402 is set to the MAC address of the hub sending the current frame. Channel Dwell Length field 403 is set to the length of the time, in units of beacon periods, over which the hub sending frame 400 is to operate at a chosen channel before hopping to another one. Channel Dwell Phase field 404 identifies when the hub sending the current beacon frame is to hop to the next channel in its channel hopping sequence. If the hub supports random access support, Minimum B+RAP1 Length field 405 is set to the smallest value guaranteed for the B+RAP1 Length field in the beacons from the hub sending this frame. The B+RAP1 Length field is set to the length of the random access phase (RAP), in units of allocation slots, that starts at the end of the beacon frame in the next beacon period, plus the beacon transmission time that precedes. Status Code field 406 is set to the status of the connection assignment, which indicates if the connection request was accepted or rejected and, if rejected, the reason for the rejection.

Security Requirement field 407 includes data to identify the lowest security level required by the node and to identify whether control frames sent to the node must be authenticated and/or encrypted. Security Capability field 408 includes information identifying the highest security level supported by the node. MAC Capability field 409 includes data indicating whether the node supports block acknowledgement policy, polls, random access, battery level indication, and other MAC functions. PHY Capability field 410 indicates whether the node supports lower power wakeup radio and the data rates supported by the node. Node identifier (MD) field 411 is set to a NID that is uniquely assigned or reassigned to the addressed node within the hub's subnet.

Change Indication field 412 indicates whether any of the information in fields 413-418 have changed since the last connection request or connection assignment. Next Wakeup field 413 is set to the sequence number of the beacon transmitted in the beacon period, referred to as the node's wakeup beacon period, in which the node will wake up for frame reception and transmission. Wakeup Interval field 414 is set to the length, in units of beacon periods, between the start of successive wakeups of the node, and is effective from the next wakeup indicated in field 413. Wakeup Interval field 414 is set to 1 for 1-periodic allocations and to m>1 for m-periodic allocations. Uplink Request information element (IE) field 415 indicates a request for creation or modification of scheduled uplink allocations for the node. Downlink Request IE field 416 indicates a request for creation or modification of scheduled downlink allocations for the node. Bilink Request IE field 417 indicates a request for creation or modification of scheduled bilink allocations for the node. Channel Order IE 418 indicates some or all of the channels that may be used as operating channels by the node and the order in which the channels are to be selected.

Scheduled allocations may be for either an uplink or for a downlink. An uplink allocation is for transmissions initiated by a node and any corresponding acknowledgments returned by the hub. A downlink allocation is for transmissions initiated by the hub and any acknowledgments returned by the node.

Figure 5:
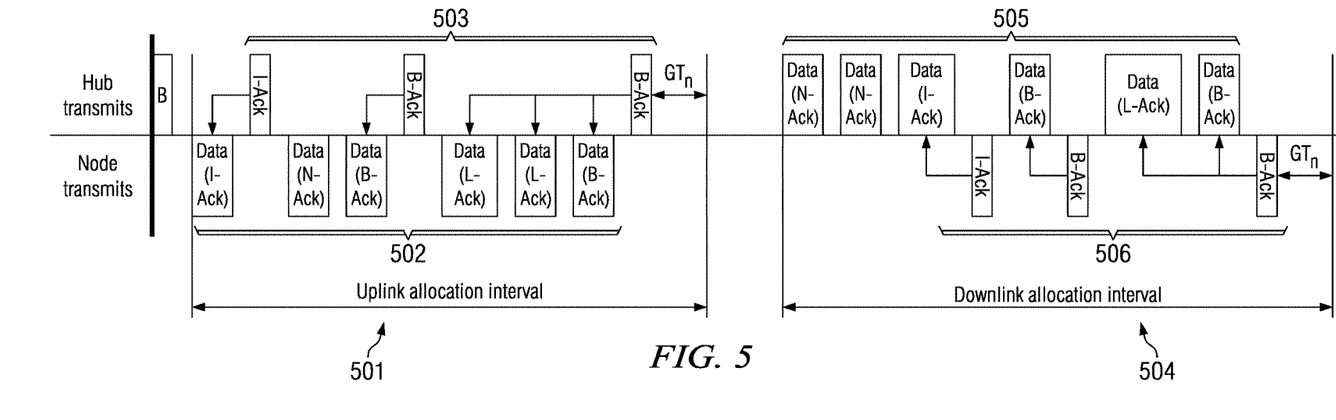
FIG. 5 illustrates uplink and downlink frame transactions between a hub and a node.

FIG. 5 illustrates uplink and downlink frame transactions between a hub and a node. Upon receiving Connection Assignment frame 400, the node may start initiating frame transactions with the hub in a scheduled uplink allocation. Likewise, upon successfully sending Connection Assignment frame 400, the hub may start initiating frame transactions with the node in a scheduled downlink allocation. The node initiates transactions in the uplink allocation intervals 501 that were granted by the hub. The hub receives the frames 502 transmitted by the node and acknowledges 503 the frames during the allocation intervals as appropriate. The hub initiates transactions in the downlink allocation intervals 504 granted to the node. The node shall be ready to receive the frames 505 transmitted by the hub and acknowledge 506 them during the allocation intervals as appropriate.

Scheduled allocations may also be bilink, which provides transfer of management and data traffic from a hub to a node and/or vice versa. A bilink allocation is an allocation of intervals in which a hub or a node initiates one or more frame transactions to transmit management and data traffic to a node or a hub, respectively, and the recipient returns acknowledgment, if required. However, the node initiates bilink frame transactions only after receiving a poll from the hub.

Figure 6:
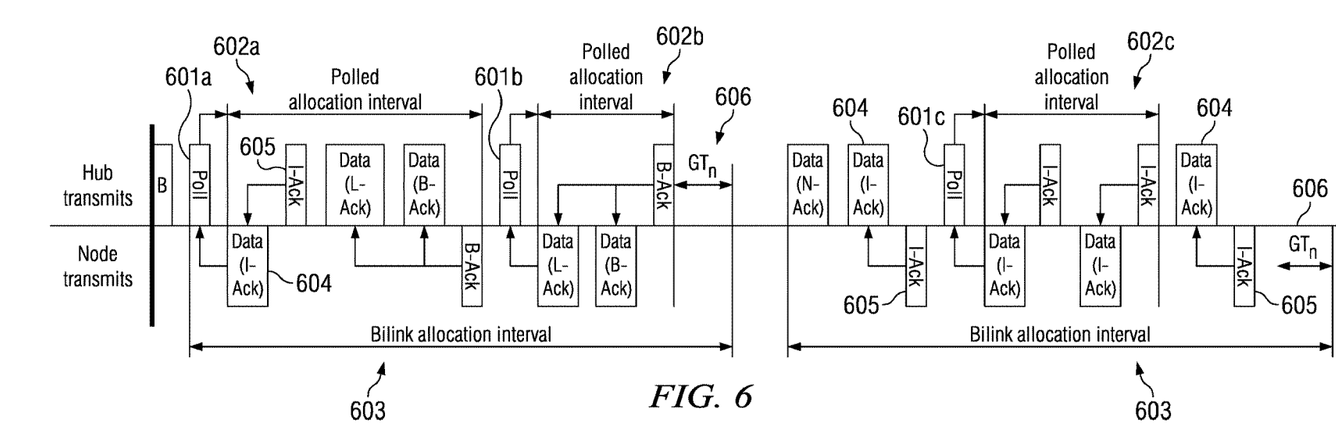
FIG. 6 illustrates bilink frame transactions between a hub and a node.

FIG. 6 illustrates bilink frame transactions between a hub and a node. Upon successfully sending Connection Assignment frame 400, the hub may start initiating frame transactions with the node, or the hub may start sending a poll 601 to the node for the node to initiate one or more frame transactions. The poll 601*a-c* specifies a corresponding polled allocation interval 602*a-c*. The polled allocation intervals 602*a-c* are within one of the bilink allocation intervals 603 that were granted to the node by the hub. The node does not initiate a frame transaction until it receives a poll or timed-poll (T-Poll) frame 601 during a bilink allocation interval 603. A poll frame is transmitted by a hub to grant the addressed node an immediate polled allocation that starts turnaround inter-frame space (TIFS) after the end of the frame. Alternatively, the poll frame may inform the node of a future poll. Whichever device is the recipient, the node or the hub, must be ready to receive the frames 604 transmitted by the sender and return appropriate acknowledgement frames 605 during the allocation intervals 603.

Turnaround inter-frame space (TIFS) separates frames that are transmitted by the node or hub. The node or the hub may initiate another frame transaction in a scheduled uplink or downlink allocation interval, respectively, time TIFS after the end of the expected acknowledgment frame regardless of whether it received the acknowledgment frame. The node and the hub ensure that the frame transactions, including acknowledgment frames, stay within their scheduled uplink or downlink allocation intervals, respectively, by taking the appropriate guardtime (GTn) 606 into account. The hub and node ensure that the frame transactions, including acknowledgment frames if required, stay within the scheduled bilink allocation intervals 603 and take the appropriate guardtime 606 into account.

A node modifies existing scheduled allocations by sending another Connection Request frame specifying the new requirements. The hub sets the Change Indication field in the responding Connection Assignment frame with reference to the last Connection Assignment frame sent to the node. In particular, if the hub rejects the modifications but maintains the existing allocations, the hub responds with a Connection Assignment frame with the Change Indication field set to 0, indicating no change, and the other fields kept to the respective values contained in the last Connection Assignment frame sent to the node.

A hub may, but preferably does not, modify scheduled allocations of a node on its own by sending the node an unsolicited Connection Assignment frame specifying the new assignments to those allocations. The Change Indication field in the unsolicited Connection Assignment frame is set with reference to the last Connection Assignment frame sent by the hub to the same node.

In addition to the scheduled and polled access described above, the hub may provide a transient allocation. The transient allocation is one or more time intervals that apply only for the current or next beacon period. The hub may provide the transient allocation for a single connected node or for any unconnected nodes. The transient allocation is useful for aperiodic traffic, such as low duty cycle wakeup traffic. The nodes do not request for transient allocation. Instead, the hub provides a transient allocation through its beacon frame. Because the transient allocation is designated in the beacon frame itself, wrap around within the current beacon period cannot be used for transient allocations. Instead, after receiving a beacon specifying the allocation, the transient allocation is usable by the node in the next beacon period. The hub stops the transient allocation by removing the allocation from its beacon frame.

Figure 7:
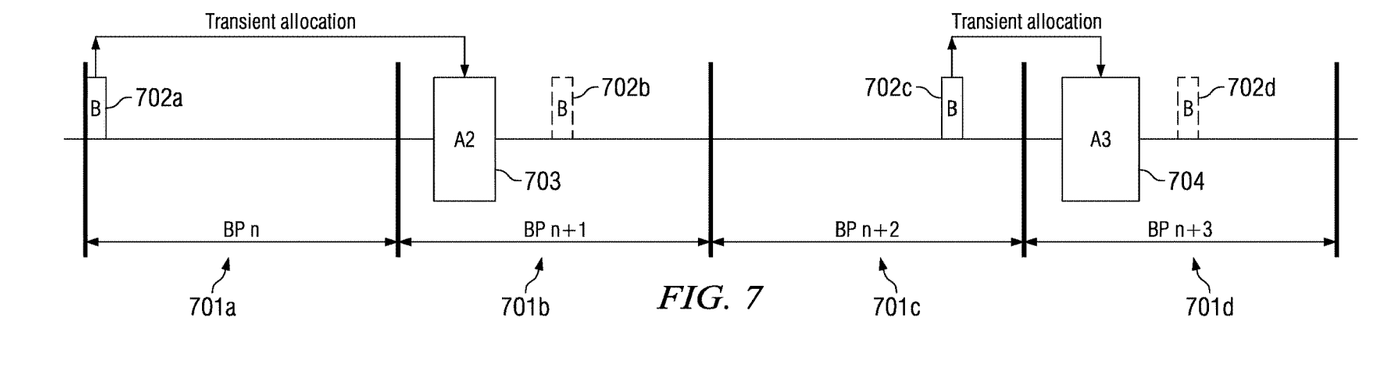
FIG. 7 illustrates transient allocations assigned by a hub.

FIG. 7 illustrates transient allocations assigned by the hub. The hub transmits beacon frames 702 within beacon periods 701. When the hub needs to provide a transient allocation, the hub designates the transient allocation interval in a beacon frame. For example, if the hub designates a transient allocation in beacon frame 702a of beacon period 701a, the transient allocation interval 703 occurs in the next beacon period 701b. If the transient allocation is removed from the beacon frame after beacon 702a is sent (i.e. no transient allocation in beacon frame 702b), then the transient allocation interval is not available in the subsequent beacon periods 701c,d. The hub may provide a second transient allocation by designating the allocation in a later beacon frame. For example, in beacon frame 702c of beacon period 701c, the hub designates transient allocation interval 704, which occurs in beacon period 701d. The transient allocations 703, 704 may be assigned to separate connected nodes, to the same connected node, or to any unconnected nodes.

A node and a hub may provide on-demand contention-free frame exchanges within their subnet using polls and posts. A polled allocation is a time interval of specified length that starts TIFS after a Poll sent by the hub for access by a single connected node or by unconnected nodes. A polled allocation is suitable for "unexpected" or "extra" uplink traffic (for example, due to data rate variations and/or channel impairments). The polled allocations are always for uplink transmissions that are initiated by a node and acknowledgments, if any, returned by the hub. A poll may be classified as homogeneous, heterogeneous, or random. A homogeneous poll occurs not later than TIFS after the beacon frame or an allocation interval given to the polled node. A heterogeneous poll occurs TIFS after a scheduled allocation given to any node other than the polled node. A random poll occurs anywhere between allocations.

A node does not explicitly request a polled allocation, but instead indicates a need for a polled allocation by indicating it has more data when sending a frame. The node indicates its ability and willingness to support certain polls. The hub sends a Poll to the node that has indicated a need of a polled allocation. A polled allocation contains a time interval that does not reoccur in subsequent beacon periods without the hub invoking another instance of polled access. A hub sends polls and grants polled allocations to a node only if both of the devices support polls. A hub may send polls granting polled allocations to unconnected nodes any time outside beacon frames and scheduled allocations without regard to the poll support indicated by the connected nodes in its subnet.

In one embodiment, a node obtains a polled allocation for initiating another frame transaction using a More Data field in the frame it is transmitting. The node sets an Acknowledgement (Ack) Policy field to indicate immediate acknowledgment (I-Ack) or block acknowledgment (B-Ack) for some management or data type frames. An I-Ack frame has no payload, but is transmitted by a hub or node to acknowledge receipt of the proceeding frame. A B-Ack frame contains a frame payload and is transmitted by the hub or node to acknowledge the reception of certain preceding data type frames the requested block or later acknowledgement (L-Ack). A Poll frame contains no frame payload and is transmitted by a hub either (1) to grant to the addressed node an immediate polled allocation that starts TIFS after the end of the frame or (2) to inform the node of a future poll. A T-Poll frame contains a frame payload that includes a current transmission time, which provides the hub's current time for synchronization of the node's clock to the hub's clock. The T-Poll frame is transmitted by a hub either (1) to grant to the node an immediate polled allocation that starts TIFS after the end of the frame or (2) to inform the node of a future poll.

An I-Ack+Poll frame contains no frame payload and is transmitted by a hub to acknowledge receipt of the preceding frame and to send a poll to the addressed node. The I-Ack+Poll frame is equivalent in function to an I-Ack frame followed by a Poll frame. A B-Ack+Poll frame contains a frame payload and is transmitted by a hub to acknowledge the reception of certain preceding data type frames and to send a poll to the addressed node. The B-Ack+Poll frame is equivalent in function to a B-Ack frame followed by a Poll frame. This enables the hub to send the node a poll at an announced time through an I-Ack+Poll or B-Ack+Poll frame. The hub grants an immediate polled allocation to a node by sending a Poll or T-Poll frame to the node, when appropriate, or by sending an I-Ack+Poll or B-Ack+Poll frame when required to return an acknowledgment. Instead of granting an immediate polled allocation, the hub may inform the node of an intended future poll by sending a Poll, T-Poll, I-Ack+Poll or B-Ack+Poll frame that indicates a time for the future poll. The hub then sends a Poll or T-Poll frame at the time indicated in a frame previously sent to the node.

Figure 8:
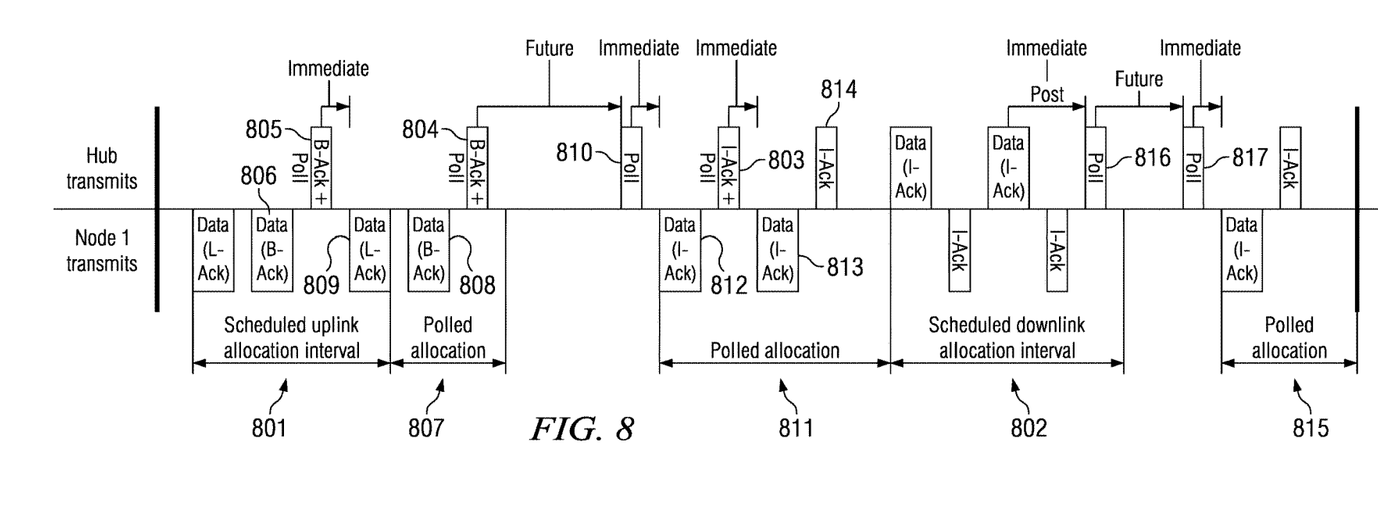
FIG. 8 illustrates polled allocations in relation to scheduled allocation intervals.

FIG. 8 illustrates polled allocations in relation to scheduled allocation intervals. A node is assigned scheduled allocation intervals 801 and 802 in which it transmits frames to the hub (801) or receives and acknowledges frames from the hub (802). The node receives I-Ack+Poll (803) and B-Ack+Poll (804, 805) frames from the hub at times expected for acknowledgment arrivals. The node initiates a frame transaction at the start of a polled allocation granted to it through a preceding Poll, T-Poll, I-Ack+Poll, or B-Ack+Poll frame.

For example, in response to data frame 806 from the node, the hub responds with B-Ack+Poll frame 805, which designates immediate polled allocation interval 807 that begins at the end of the current scheduled allocation interval 801.

The node sends data frame 808 at TIFS after the last data frame 809 before the start of polled allocation interval 807. The hub transmits an acknowledgment frame I-Ack or B-Ack when required, or I-Ack+Poll or B-Ack+Poll for another polled allocation at time TIFS after the end of the previous frame in a polled allocation. For example, the hub sends B-Ack+Poll 804 that acknowledges data frame 808 and notifies the node of a future poll. The hub then sends Poll frame 810 to convey an immediate polled allocation 811. The node transmits data frames 812 and 813 in polled allocation 811 and in turn receives acknowledgement frames 803 and 814, respectively. The hub may designate an additional polled allocation 815 using future (816) and immediate (817) poll frames.

When transmitting new frames or retransmitting old frames, the node may start another frame transaction in the polled allocation at time TIFS after the end of any expected acknowledgment frame regardless of whether the acknowledgment frame is received or not. The node ensures that the frame transactions in a polled allocation, including acknowledgment frames if required, stay within the polled allocation interval and take the appropriate guardtime into account. The hub may modify a polled allocation for a node by sending the node another poll through an I-Ack+Poll or B-Ack+Poll frame within the polled allocation that expands the allocation interval, effectively granting a new polled allocation in place of the existing one.

Figure 9:
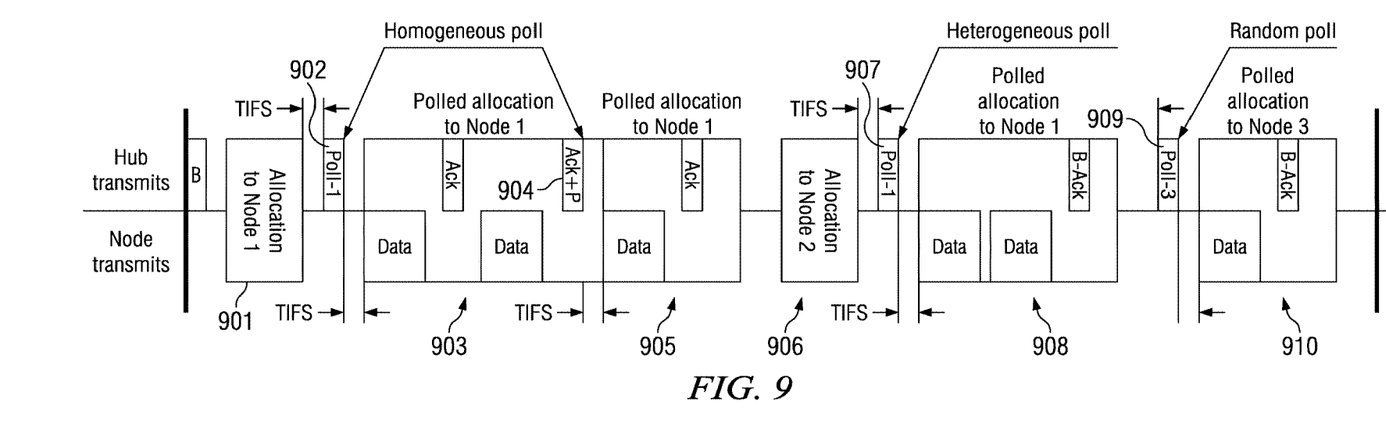
FIG. 9 illustrates polled allocations designated for a plurality of nodes.

FIG. 9 illustrates polled allocations designated for a plurality of nodes. Scheduled allocation 901 is designated for node 1. Homogenous poll 902 is sent to node 1 TIFS after allocation 901. Poll 902 designates polled allocation 903 for node 1, which sends data frames and receives acknowledgement frames during polled allocation 903. Homogenous poll 904, which may be an I-Ack+Poll or B-Ack+Poll frame, designates another polled allocation 905 for node 1. Scheduled allocation 906 is designated for node 2. Heterogeneous poll frame 907 at TIFS following node 2's allocation 906 designates another polled allocation 908 for node 1. Node 1 sends data frames and receives acknowledgement frames during polled allocation 908. Random poll frame 909 that occurs some time after the polled allocation 908 designates polled allocation 910 for node 3, which then sends data frames and receives acknowledgement frames during polled allocation 910.

When a node does not have a scheduled allocation, the hub may allocate a time interval to provide access to the node. The hub may send posts to the node granting posted allocations outside the node's scheduled allocations. The hub must have informed the node of the pending posts through previously transmitted frames. The post is a self-allocation that is useable for unexpected or extra downlink traffic caused, for example, by network management issues, data rate variations or channel impairments. The posted allocation is always for a downlink and serves transmissions initiated by the hub and any corresponding acknowledgements by the node. The post may be classified as homogeneous, heterogeneous, or random. A homogeneous post occurs not later than TIFS after a beacon or an allocation given to the posted node. A heterogeneous post occurs TIFS after a scheduled allocation given to any node other than the posted node. A random post occurs anywhere between allocations.

A node does not explicitly request for a posted allocation, but indicates its readiness for a posted allocation through its exchanged wakeup information. A node may indicates its ability and willingness to support certain posts. The hub initiates transmissions to a node in a posted allocation interval in a time not yet allocated to any node.

To obtain a posted allocation, a node that does not have a scheduled downlink allocation sends a management or data type frame with an acknowledgement policy field set to I-Ack or B-Ack in each of its wakeup beacon periods. This enables the hub to send the node a long-distance post containing essential network management information or a critical user message at a specific time through an I-Ack or B-Ack frame. To send a short-distance post to a node, the hub indicates that it has more data for the node in a non-beacon management or data type frame. To send a long-distance post to a node, a hub sends the node an I-Ack or B-Ack frame when required to return an acknowledgment.

The hub initiates frame transactions at the start of its posted allocations that have been announced in earlier frames. The node receives posts and participates in the frame transactions in its posted allocations that have been indicated through earlier frames. The node transmits an acknowledgment frame I-Ack or B-Ack when required at time TIFS after the end of the previous frame in a posted allocation. If the hub has announced in the current frame that it has another short-distance post, the hub may initiate another frame transaction, for retransmitting old frames or/and transmitting new frames, at time TIFS after the end of the expected acknowledgment frame regardless of whether it received the acknowledgment frame. The hub ensures that the frame transaction, including the acknowledgment frame if required, stays within the intended posted allocation interval, taking the appropriate guardtime into account. The posted allocation is just long enough for a frame transaction, so the hub does not modify a posted allocation once it initializes a frame transaction. The hub may grant itself another posted allocation for initializing another frame transaction by informing the target node of the time of the new allocation through the current frame.

Figure 10:
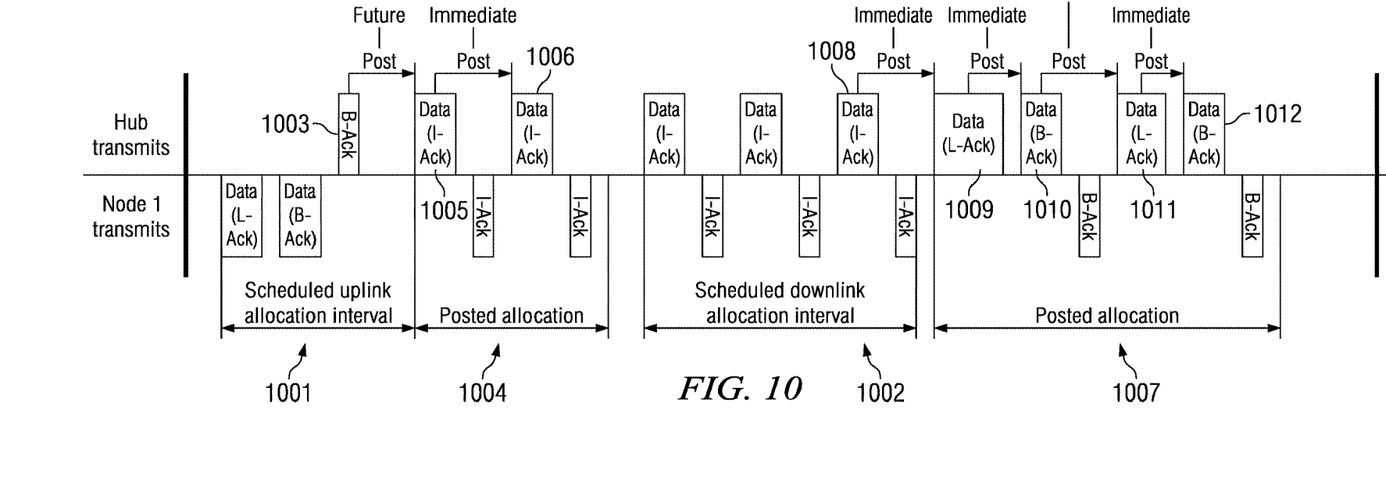
FIG. 10 illustrates posts and posted allocation according to one embodiment.

FIG. 10 illustrates posts and posted allocation according to one embodiment. Scheduled uplink (1001) and downlink (1002) allocation intervals are designated for a node. In B-Ack 1003 during scheduled allocation interval 1001, the hub designates posted allocation 1004 for the node. During posted allocation 1004, the hub transmits frame 1005 to the node. Data frame 1005 includes data notifying the node that additional frame 1006 will be transmitted in the posted allocation. During scheduled allocation interval 1002, the hub designates a posted allocation 1007 in data frame 1008 that is used to send data frames 1009-1012 to the node. Data frames 1009-1011 also notify the node that subsequent frames 1010-1012 will also be sent during the posted allocation 1007.

Figure 11:
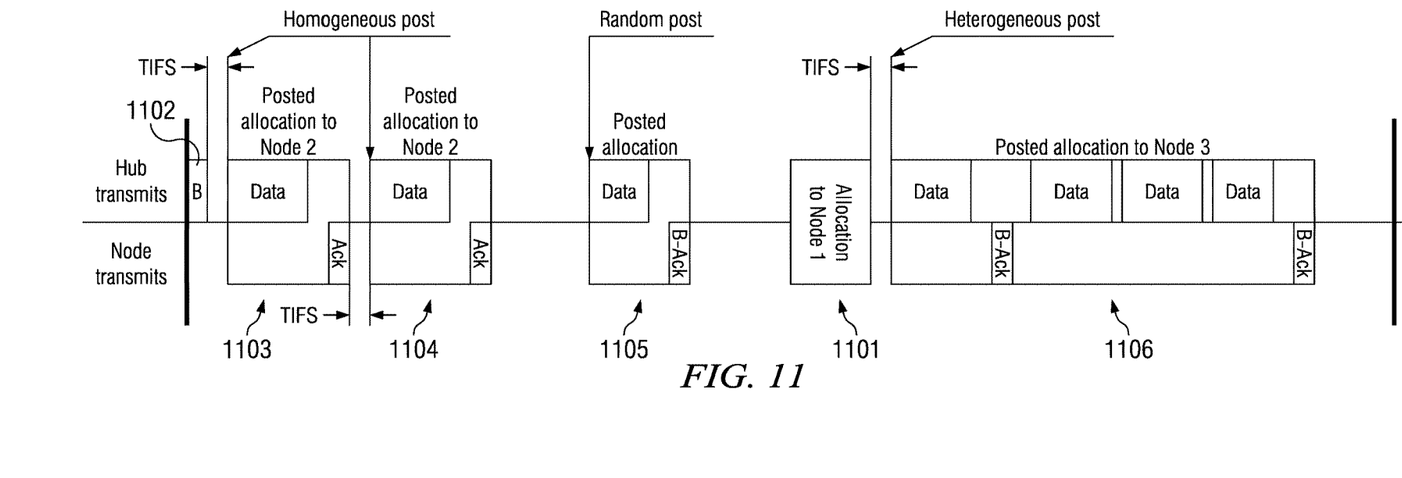
FIG. 11 illustrates posted allocations designated for a plurality of nodes.

FIG. 11 illustrates posted allocations designated for a plurality of nodes. Initially, only scheduled allocation 1101 is designated for node 1 within a beacon period. TIFS after beacon frame 1102, the hub transmits data in homogeneous posted allocation 1103 that is designated for node 2. A second posted allocation 1104 for node 2 follows TIFS after the acknowledgement in posted allocation 1103. The hub also designates a random posted allocation 1105 during the beacon period. Finally, TIFS after scheduled allocation 1101, the hub designates posted allocation 1106 for node 3 and transmits data to node 3 during the posted allocation interval.

The present disclosure takes advantage of the variety of selectable access methods describes above to control power consumption. The disclosure provides two power management states: hibernation for long-run or macroscopic power management, and sleep for short-run or microscopic power management.

A node may hibernate across a number of beacon periods, and may sleep over some time intervals even in its wakeup beacon periods. The wakeup interval field in the connection request message sent by the node is used to select sleep or hibernation states. The wakeup interval field identifies the length, in units of beacon periods, between the start of successive wakeups of the node. The information in the wakeup interval field is effective from the next wakeup indicated in the connection request. When the node hibernates, it does not receive or transmit any traffic. To hibernate in some beacon periods, the node sets the wakeup interval field in the connection request frame to an integer larger than 1. Also, the node sets the next wakeup field in the same frame to a value specifying its intended next wakeup beacon period. To wake up in every beacon period, the node sets the wakeup interval field in the connection request frame to 1, and sets the next wakeup field in the frame to a value identifying the next beacon period.

The hub receiving the connection request frame should honor the values of the received wakeup interval and next wakeup fields whenever possible, but may set them to different values, if needed, in the responding connection assignment frame. The hub may later modify these values by sending to node another connection assignment frame if warranted by new conditions. If the hub sets the Wakeup Interval field in its responding frame to an integer larger than 1, then the hub may grant only m-periodic allocations to the node. Whenever possible, these allocation intervals will be in the node's wakeup beacon periods as designated in the node's last connection request. If the hub sets the wakeup interval field in its responding frame to 1, then the hub may grant only 1-periodic allocations to the node. The allocation intervals will be in every beacon period, in accordance with the node's last connection request whenever possible.

If the wakeup interval value in the connection assignment frame last received from the hub is larger than 1, then the node shall wake up in each of its wakeup beacon periods based on the wakeup interval and next wakeup values provided in that frame by the hub. The node transmits and/or receives frames and receives the beacon frame, if needed, in the granted m-periodic allocation intervals. If the wakeup interval value in the connection assignment frame last received from the hub is 1, the node wakes up in every beacon period and transmits and/or receives frames, including the beacon frame, in the granted 1-periodic allocation intervals.

Figure 12:
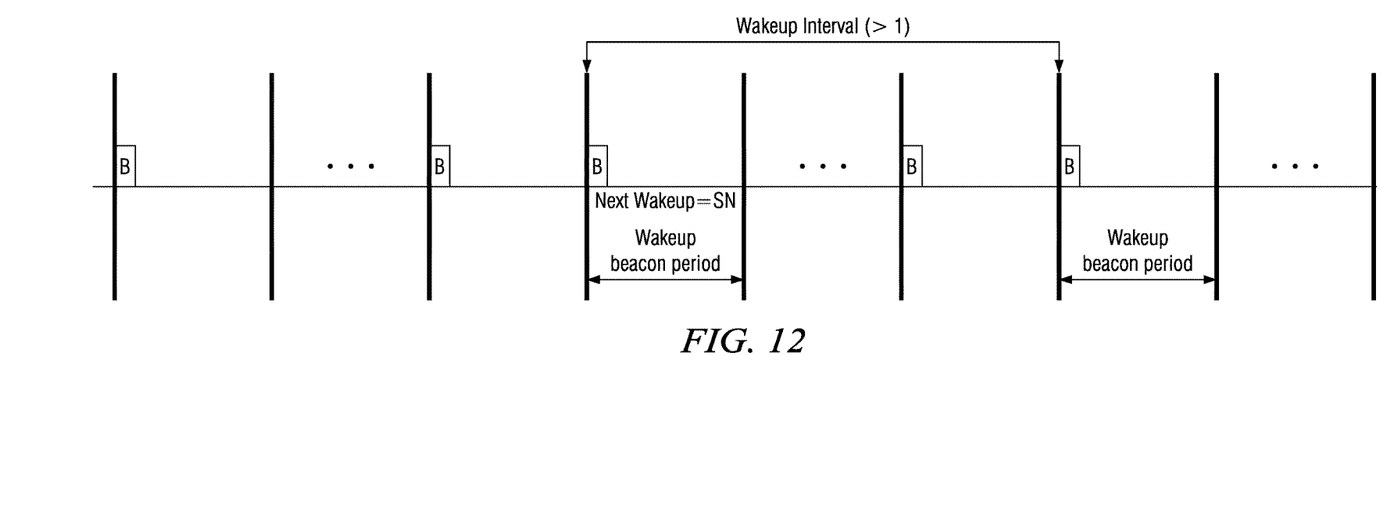
FIG. 12 illustrates macroscopic power management using node hibernation across a plurality of beacon periods.

FIG. 12 illustrates macroscopic power management using node hibernation across a plurality of beacon periods. The node's connection request message designates a value greater than one in the wakeup interval field, which indicates that the node will wake up in every third beacon period. The node also sets the next wakeup field to the sequence number (SN) of the beacon frame in the next wakeup period.

Figure 13:
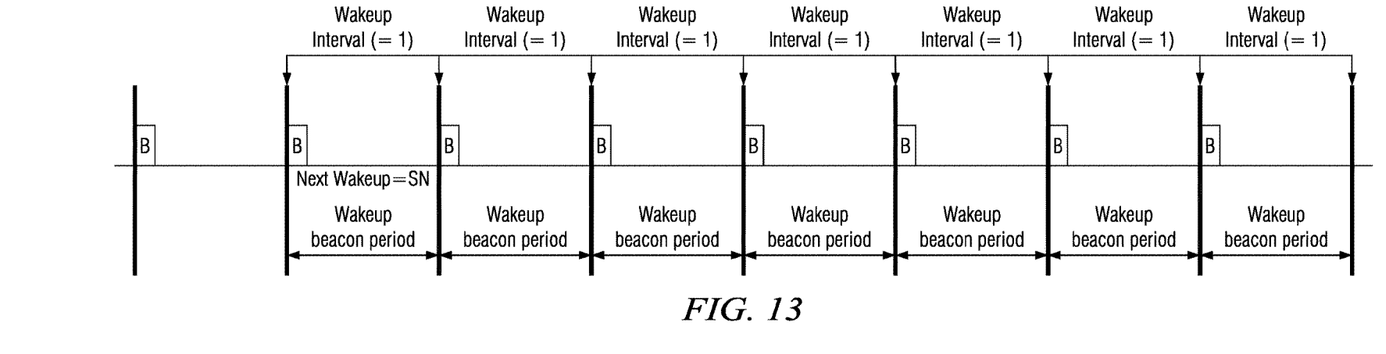
FIG. 13 illustrates macroscopic power management using node hibernation across a single beacon periods.

FIG. 13 illustrates macroscopic power management using node hibernation across a single beacon periods. The node's connection request message designates the value one, which indicates that the node will wake up in every beacon period. The node also sets the next wakeup field to the sequence number of the next beacon frame.

A node wakes up to receive a beacon frame from a hub when it needs beacon reception to synchronize with the hub or to obtain certain information contained in a beacon. A node wakes up to receive and transmit frames in its scheduled allocations in its wakeup beacon periods. In addition, the node stays active participating in frame transactions in its expected posted allocations. The hub transmits in the posted allocations for a node in the node's wakeup beacon periods, if possible. If the node did not receive a frame at the announced time for a pending post, then the node stays in receive mode until the hub could have finished a frame transaction for the post and retransmitted a frame TIFS later.

If the node has indicated its support for polls in its last connection request frame, the node also stays active in such times as to receive announced polls and initiate frame transactions in its polled allocations. The hub should have the polled allocations of a node to occur in the node's wakeup beacon periods, if possible. Outside the time intervals noted above, the node may enter a sleep mode without receiving or transmitting any traffic.

Figure 14:
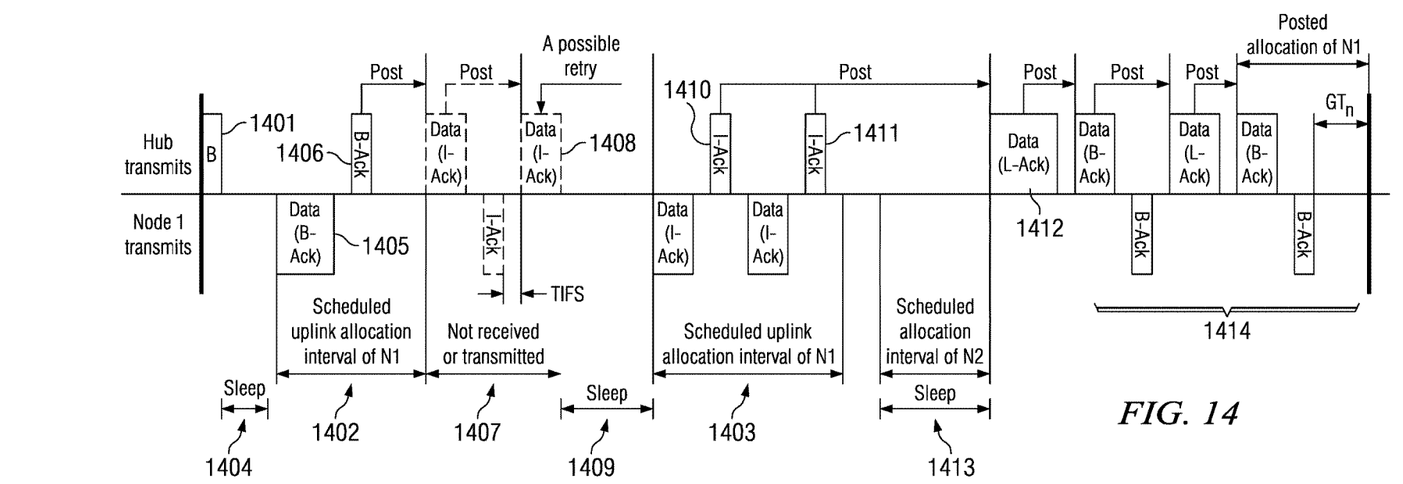
FIG. 14 illustrates hub and node activity and sleep modes in a beacon period having scheduled and posted allocations.

FIG. 14 illustrates hub and node activity and sleep modes in a wakeup beacon period having scheduled and posted allocations. The hub broadcasts beacon frame 1401 at the start of the beacon frame. Node 1 has been assigned allocation intervals 1402 and 1403. Node 1 may sleep (1404) following beacon frame 1401, but must wake up for the start of scheduled allocation interval 1402 to transmit data frame 1405 and receive acknowledgement B-Ack 1406. Node 1 stays in the wake up state during its posted allocation interval 1407 to receive data from the hub including time for a possible retry transmission (1408) by the hub in the event that the first frame in the posted allocation interval is not received or acknowledged.

Following the posted allocation interval 1407, node 1 may sleep (1409) until the start of scheduled allocation interval 1403. During scheduled allocation interval 1403, node 1 must wake up to transmit data frames and receive acknowledgement frames, including I-Ack frames 1410, 1411 that designate a time for a future post frame 1412. Node 1 may sleep (1413) during the interval between scheduled allocation interval 1403 and posted allocation 1412, which period is allocated for a different node. Node 1 remains in the wake up state to receive data frames from the hub in additional posted allocation intervals (1414) designated in the current beacon period.

Figure 15:
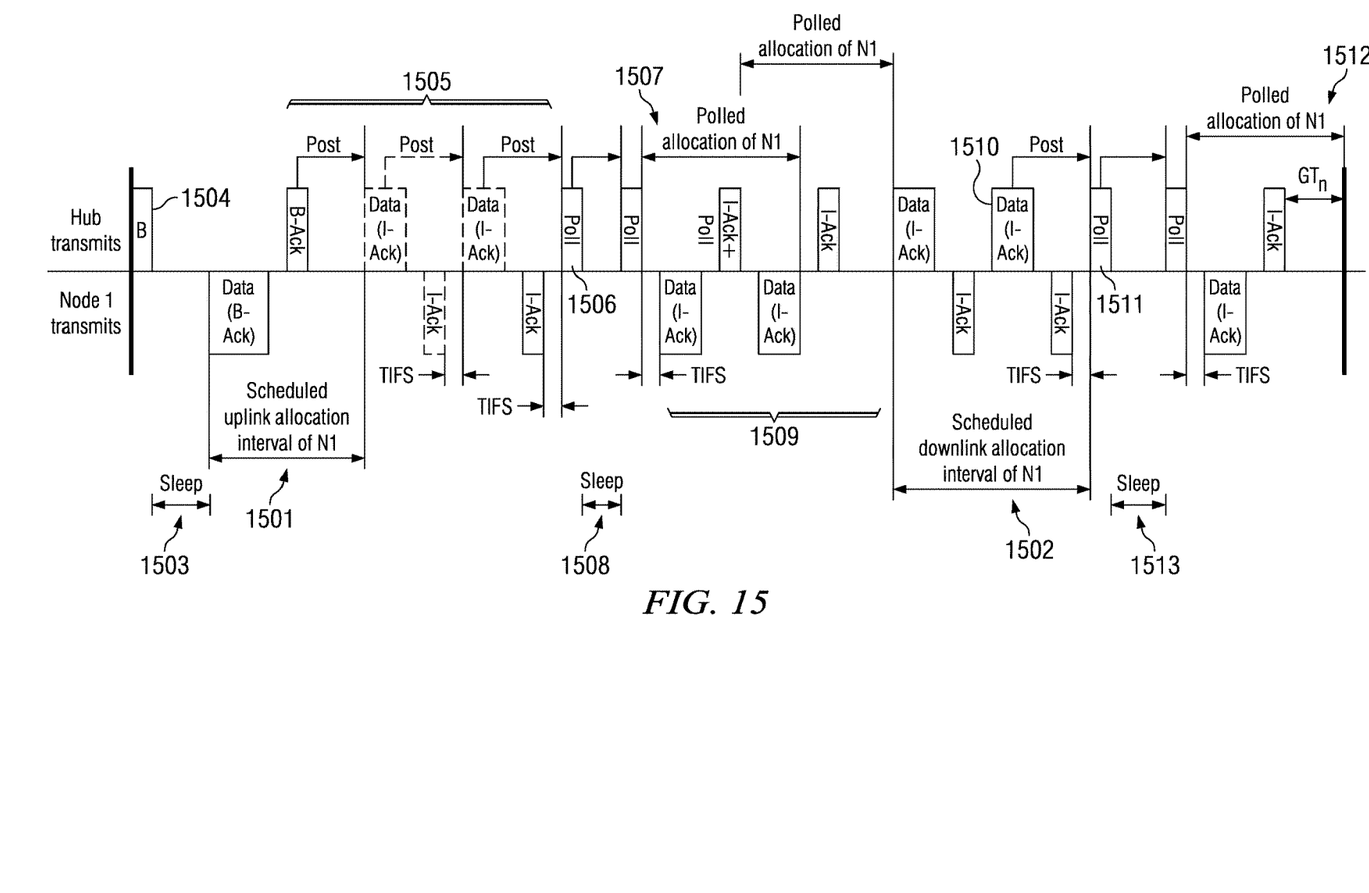
FIG. 15 illustrates hub and node activity and sleep modes in a beacon period having scheduled, posted and polled allocations.

FIG. 15 illustrates hub and node activity and sleep modes in a wakeup beacon period having scheduled, posted and polled allocations. Node 1 is assigned scheduled allocation intervals 1501 and 1502, which allows node 1 to sleep (1503) between the beacon frame 1504 and the beginning of the first scheduled allocation interval. Following scheduled allocation interval 1501, node 1 remains awake for a series of posted allocation intervals 1505.

The hub transmits poll 1506 to node 1, which designates a future poll conveying a polled allocation 1507. Node 1 sleeps (1508) during the interval between receiving the last poll 1506 and the next poll that starts polled allocation 1507. Node 1 remains in the wake up state during subsequent polled allocations 1509 and during scheduled allocation interval 1502. During scheduled allocation interval 1502, the hub transmits immediate post data in frame 1510, while indicating a poll frame 1511 that follows scheduled allocation interval 1502. Poll frame 1511 designates another future poll that conveys polled allocation 1512. Node 1 sleeps (1513) during the period between poll frame 1511 and the poll frame immediately before polled allocation 1512. Node 1 then wakes up again to receive the next poll for polled allocation 1512, which lasts through the end of the beacon period.

Figure 16:
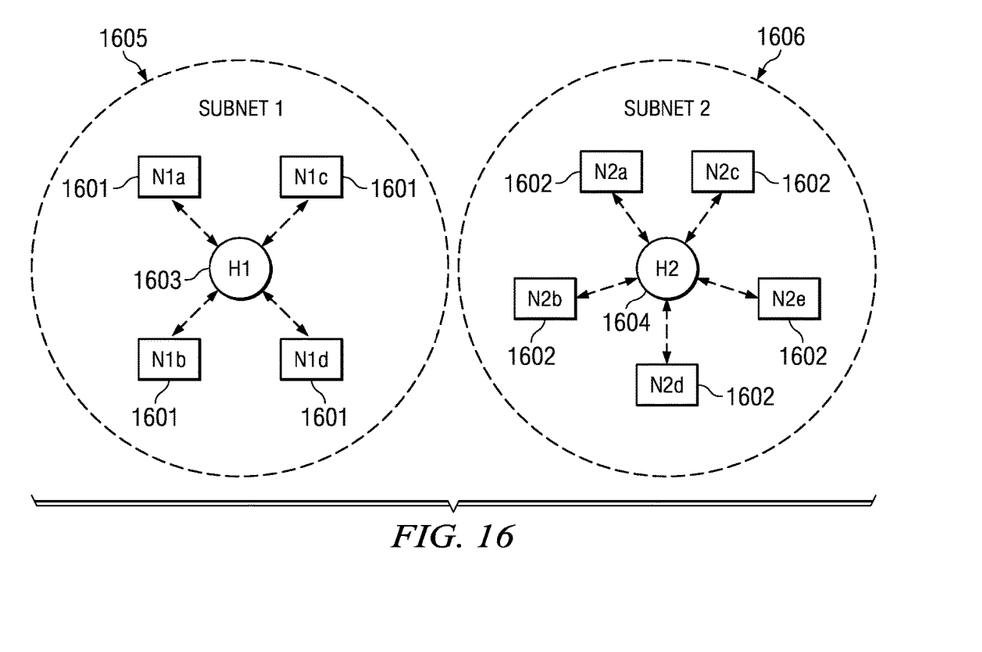
FIG. 16 is a block diagram illustrating a network topology employing embodiments of the disclosure.

FIG. 16 is a block diagram illustrating a network topology employing embodiments of the disclosure. Nodes 1601, 1602 and hubs 1603, 1604 are organized into logical sets, referred to as subnets. In the illustrated embodiment, there is only one hub in a subnet, but the number of nodes in a subnet may vary. For example, subnet-1 1605 comprises hub 1603 and plurality of nodes 1601, and subnet-2 1606 comprises hub 1604 and plurality of nodes 1602. In one embodiment, messages are exchanged directly between the nodes and their respective hub—i.e. within the same subnet only. In another embodiment of the disclosure, messages may be exchanged between different subnets. The hub and nodes may communicate using a wireless or wireline connection. Each hub 1603, 1604 provides scheduled, transient, polled, and posted access to its respective nodes. The nodes 1601, 1602 may obtain access using the procedures described herein.

Figure 17:
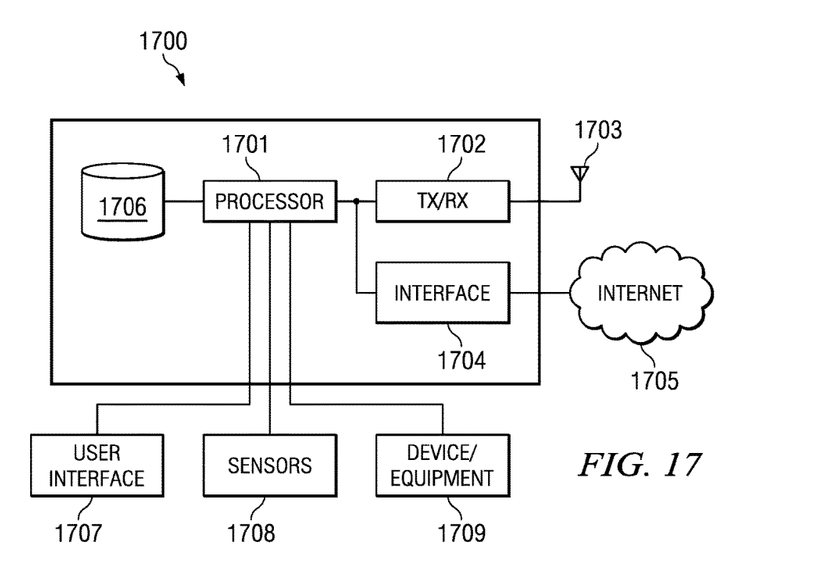
FIG. 17 is a block diagram of an exemplary embodiment of a device for providing communications with another device.

FIG. 17 is a block diagram of an exemplary embodiment of a device 1700 for providing communications with another device. Device 1700 may be used as a node 1601, 1602 and/or a hub 1603, 1604 in FIG. 16. In one embodiment, device 1700 is a hub, gateway, or controller controlling and communicating with one or more nodes. Processor 1701 processes messages to be exchanged with a hub or nodes via transceiver 1702 and antenna 1703 and/or via wireline interface 1704 coupled to Internet or another network 1705. Processor 1701 may be a software, firmware, or hardware based device. Processor 1701 may generate frames for transmission to other devices, and may receive and process frames from other devices. The frames may include data and acknowledgement frames, including beacon frames, poll frames, and post frames as described herein. Processor 1701 may further manage power usage in the device 1700 by controlling when the device enters a sleep mode, hibernation mode, or wake up state.

Memory 1706 may be used to store frame and allocation interval data. Memory 1706 may be secured from unauthorized access. Memory 1706 may also be used to store computer program instructions, software and firmware used by processor 1701. It will be understood that memory 1706 may be any applicable storage device, such as a fixed or removable RAM, ROM, flash memory, or disc drive that is separate from or integral to processor 1701.

Device 1700 may be coupled to other devices, such as user interface 1707, sensors 1708, or other devices or equipment 1709. In one embodiment, device 1700 is a low-power wireless node operating on, in, or around a human or non-human body to serve one or more applications, such as medical connections, consumer electronics, and personal entertainment. Device 1700 may be adapted to operate in a body area network either as a node or as a hub controlling a plurality of nodes. Sensors 1708 may be used, for example, to monitor vital patient data, such as body temperature, heart rate, and respiration. Equipment 1709 may be, for example, a monitor or other device that receives and analyzes signals, such as a patient's temperature, heart rate, and respiration, from another node. Alternatively, equipment 1709 may be a device for providing a service to a patient, such as controlling an intravenous drip, respirator, or pacemaker. When used as a node or hub in a body area network, the information transmitted or received by device 1700 is likely to include sensitive or critical medical information or instructions. Accordingly, it is important to ensure that device 1700 is able to timely perform transmission or reception tasks while efficiently managing power consumption.

It will be understood that the subnets 1605, 1606 in FIG. 16 and device 1700 in FIG. 17 are presented for illustrative purposes only and are not intended to limit the scope of the systems or devices that are capable of employing the scheduled, transient, polled and posted allocations and power management procedures described herein to communicate with other devices.

Many modifications and other embodiments of the disclosure will come to mind to one skilled in the art to which this disclosure pertains having the benefit of the teachings presented in the foregoing descriptions, and the associated drawings. Therefore, it is to be understood that the disclosure is not to be limited to the specific embodiments disclosed. Although specific terms are employed herein, they are used in a generic and descriptive sense only and not for purposes of limitation.

What is claimed is:

1. A method of macroscopic power management by a body area network (BAN) node, comprising:
   transmitting a connection request frame to a network hub, the connection request frame including:
     a first requested wakeup field specifying a unit of beacon periods; and
     a second requested wakeup field specifying an intended next wakeup beacon period;
   receiving a connection assignment frame from the network hub, the connection assignment frame including a first assigned wakeup field associated with a periodic allocation and a second assigned wakeup field associated with an assigned next wakeup beacon period;
   entering an inactive state; and
   waking up based on the first assigned wakeup field and the second assigned wakeup field.

2. The method of claim 1, wherein the entering the inactive state includes suspending a transmission and a reception of frames.

3. The method of claim 1, wherein the waking up includes resuming a transmission and a reception of frames.

4. The method of claim 1, wherein the periodic allocation includes only an m-periodic allocation when the first assigned wakeup field has an integer value not equal to 1.

5. The method of claim 1, wherein the periodic allocation includes only a 1-periodic allocation when the first assigned wakeup field has an integer value equal to 1.

6. The method of claim 1, wherein the waking up includes waking up in each of an allocated set of wakeup beacon periods based on the first assigned wakeup field and the second assigned wakeup field if the periodic allocation is not equal to 1.

7. The method of claim 1, wherein the waking up includes waking up in each of the beacon periods if the periodic allocation is equal to 1.

8. A body area network (BAN) device, comprising:
   a memory storing a set of instructions for performing macroscopic power management;
   a processor coupled to the memory, and upon implementing the set of instructions, the processor configured to cause the BAN device to:
     transmit a connection request frame to a network hub, the connection request frame including:
       a first requested wakeup field specifying a unit of beacon periods; and
       a second requested wakeup field specifying an intended next wakeup beacon period;
     receive a connection assignment frame from the network hub, the connection assignment frame including a first assigned wakeup field associated with a periodic allocation and a second assigned wakeup field associated with an assigned next wakeup beacon period;
     enter an inactive state; and wake up based on the first assigned wakeup field and the second assigned wakeup field.

9. The BAN device of claim 8, wherein during the inactive state, the processor is configured to cause the BAN device to suspend a transmission and a reception of frames.

10. The BAN device of claim 8, wherein after the inactive state, the processor is configured to cause the BAN device to resume a transmission and a reception of frames.

11. The BAN device of claim 8, wherein the periodic allocation includes only an m-periodic allocation when the first assigned wakeup field has an integer value not equal to 1.

12. The BAN device of claim 8, wherein the periodic allocation includes only a 1-periodic allocation when the first assigned wakeup field has an integer value equal to 1.

13. The BAN device of claim 8, wherein the processor is configured to cause the BAN device to wake up in each of an allocated set of wakeup beacon periods based on the first assigned wakeup field and the second assigned wakeup field if the periodic allocation is not equal to 1.

14. The BAN device of claim 8, wherein the processor is configured to cause the BAN device to wake up in each of the beacon periods if the periodic allocation is equal to 1.

15. A tangible nontransitory storage medium storing a set of instructions, which upon being implemented by a processor, causes the processor to perform a macroscopic power management scheme, comprising:
   transmitting, by a body area network (BAN) node, a connection request frame to a network hub, the connection request frame including:
      a first requested wakeup field specifying a unit of beacon periods; and
      a second requested wakeup field specifying an intended next wakeup beacon period;
   receiving, by the BAN node, a connection assignment frame from the network hub, the connection assignment frame including a first assigned wakeup field associated with a periodic allocation and a second assigned wakeup field associated with an assigned next wakeup beacon period;
   entering, by the BAN node, an inactive state; and
   waking up, by the BAN node, based on the first assigned wakeup field and the second assigned wakeup field.

16. The tangible nontransitory storage medium of claim 15, wherein the entering the inactive state includes suspending, by the BAN node, a transmission and a reception of frames, and the waking up includes resuming, by the BAN node, the transmission and the reception of frames.

17. The tangible nontransitory storage medium of claim 15, wherein the periodic allocation includes only an m-periodic allocation when the first assigned wakeup field has an integer value not equal to 1.

18. The tangible nontransitory storage medium of claim 15, wherein the periodic allocation includes only a 1-periodic allocation when the first assigned wakeup field has an integer value equal to 1.

19. The tangible nontransitory storage medium of claim 15, wherein the waking up includes waking up, by the BAN node, in each of an allocated set of wakeup beacon periods based on the first assigned wakeup field and the second assigned wakeup field if the periodic allocation is not equal to 1.

20. The tangible nontransitory storage medium of claim 15, wherein the waking up includes waking up, by the BAN node, in each of the beacon periods if the periodic allocation is equal to 1.

* * * * *